(12) United States Patent
Kim et al.

(10) Patent No.: US 9,941,785 B2
(45) Date of Patent: Apr. 10, 2018

(54) POWER FACTOR CORRECTION CIRCUIT AND ELECTRONIC PRODUCT INCLUDING THE SAME

(71) Applicants: Samsung Electronics Co., Ltd., Suwon-si (KR); Seoul National University R&DB Foundation, Seoul (KR)

(72) Inventors: Jin-Han Kim, Suwon-si (KR); Han Sol Seo, Seoul (KR); Bo Hyung Cho, Seoul (KR); Paul Jang, Seoul (KR); Sang Woo Kang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/981,314

(22) Filed: Dec. 28, 2015

(65) Prior Publication Data

US 2016/0190914 A1 Jun. 30, 2016

(30) Foreign Application Priority Data

Dec. 30, 2014 (KR) ........................ 10-2014-0192915

(51) Int. Cl.
*H02M 1/42* (2007.01)
*H02M 1/44* (2007.01)
*H02M 7/217* (2006.01)
*H02M 1/12* (2006.01)

(52) U.S. Cl.
CPC ........... *H02M 1/4225* (2013.01); *H02M 1/44* (2013.01); *H02M 2001/123* (2013.01); *Y02B 70/126* (2013.01)

(58) Field of Classification Search
CPC .... H02M 1/42; H02M 1/4225; H02M 1/4233; H02M 1/425; H02M 7/217; G05F 1/70
See application file for complete search history.

(56) References Cited

U.S. PATENT DOCUMENTS

| 8,199,541 | B2 * | 6/2012 | Yang | H02M 1/4208 323/207 |
|---|---|---|---|---|
| 2009/0230929 | A1 | 9/2009 | Sui et al. | |
| 2011/0075462 | A1 * | 3/2011 | Wildash | H02M 1/4208 363/127 |
| 2013/0016545 | A1 * | 1/2013 | Xu | H02M 1/44 363/126 |

(Continued)

FOREIGN PATENT DOCUMENTS

KR 20010047576 6/2001

*Primary Examiner* — Gary L Laxton
(74) *Attorney, Agent, or Firm* — McAndrews, Held & Malloy, Ltd.

(57) ABSTRACT

A power factor correction circuit and an electronic product including the same are disclosed. This technology configures a bridgeless circuit with no rectifier diode by using an additional switch, eliminating conduction loss due to the diode and reducing common mode EMI noise of the power factor correction circuit. A power factor correction circuit includes at least one inductor directly connected to an AC input stage, an output capacitor to smooth the output voltage, first switching elements to control current to store magnetic energy in the inductor, and a second switching element to maintain a substantially constant voltage between a ground voltage of an AC input stage and a ground voltage of an output stage.

18 Claims, 11 Drawing Sheets

(56) References Cited

U.S. PATENT DOCUMENTS

| | | | |
|---|---|---|---|
| 2015/0162822 A1* | 6/2015 | Ho ..................... | H02M 1/4208 363/89 |
| 2015/0171734 A1* | 6/2015 | Yu .......................... | H02M 1/12 363/45 |
| 2015/0280548 A1* | 10/2015 | Shoyama ............ | H02M 1/4225 363/126 |

\* cited by examiner

Mode3:V<sub>D</sub><0,Q1=ON,Q2=OFF,Q3=ON

POWER FACTOR CORRECTION CIRCUIT AND ELECTRONIC PRODUCT INCLUDING THE SAME

RELATED APPLICATION(S)

This application claims the benefit of Korean Patent Application No. 2014-0192915, filed on Dec. 30, 2014 in the Korean Intellectual Property Office, the disclosure of which is incorporated herein by reference.

BACKGROUND

Embodiments of the present disclosure relate to a power factor correction circuit, and particularly to a high efficiency power factor correction circuit that reduces electromagnetic interference (EMI) noise.

A power factor of an alternating current (AC) power system is defined as a ratio of real power for a load to apparent power. This power factor is usually referred to as PF. For example, a power factor of an AC power system having a sinusoidal current waveform and a sinusoidal voltage waveform is represented as a cosine of a phase angle (cos θ) between the current waveform and the voltage waveform. Voltage is multiplied by current to calculate power of a DC circuit, but to calculate power of an AC circuit a root-mean-square (RMS) value of a voltage and a current is multiplied by a factor cos θ. The power factor of the AC power system having a non-sinusoidal current or voltage waveform are affected by several factors, including a displacement factor related to the phase angle and a distortion factor related to a non-sinusoidal waveform.

Generally, real power (for example, watt) may be defined as power that does actual work, and reactive power may be defined as power required to generate a magnetic field (for example, power loss) so that the actual work can be performed, and apparent power may be defined as a total power required to generate the desired real power. The power factor of the AC power system may vary in a range between 0 and 1, where 1 indicates a pure resistive circuit with no reactive power loss. If the power factor of the AC power system is not 1, then either the current waveform lags the voltage waveform or vice versa. As a result, power loss occurs, and harmonic waves passing through the AC power system may be potentially generated and interfere with other devices.

A load connected to a power source rarely includes only a pure resistive component, but usually has a capacitive load and/or an inductive load. Accordingly, a reactive power loss usually occurs. When an AC voltage is converted to a DC voltage and the DC voltage is used, a smoothing capacitor is used to reduce the AC component, which causes a decrease in the power factor. In order to reduce reactive power loss, a number of types of power factor correction circuits that make an input voltage have nearly the same phase as an input current are used. In particular, in a device that converts an AC voltage into a DC voltage and uses the DC voltage, a scheme of improving a power factor using a voltage step-up converter, that is, a boost converter, is often used.

Therefore, it is possible to increase the power factor of the AC power system using a power factor correction (PFC) circuit.

SUMMARY

The present disclosure relates to a power factor correction circuit and an electronic product including the power factor correction circuit, and an object of the present disclosure is to improve electrical efficiency while reducing common mode electromagnetic interference (EMI) noise.

A power factor correction circuit according to an embodiment for achieving the above object includes at least one inductor directly connected to an AC input stage, a plurality of first switching elements configured to control current to store magnetic energy in the at least one inductor, an output capacitor configured to smooth the DC voltage, and a second switching element configured to maintain a substantially constant voltage between a ground voltage of the AC input stage and a ground voltage of an output stage.

The second switching element may be connected in series between the plurality of first switching elements and the output capacitor.

The voltage between the ground voltage of the AC input stage and the ground voltage of the output stage may be due to parasitic capacitance present in the power factor correction circuit.

The voltage between the ground voltage of the AC input stage and the ground voltage of the output stage may be maintained to be substantially constant at a value corresponding to a difference between the AC input voltage and the DC output voltage.

The DC output voltage may be a voltage across the output capacitor.

The second switching element and the plurality of first switching elements may be controllable to be turned on and turned off.

The power factor correction circuit may further include at least one diode corresponding to the at least one inductor, connected in series between the at least one inductor and the output capacitor, configured to supply energy in the magnetic energy stored in the at least one inductor to the output capacitor when any one of the plurality of first switching elements is turned off.

The output capacitor may have a positive electrode connected to a cathode of each of the at least one diode, and a negative electrode connected to a source of the second switching element. The power factor correction circuit may convert the AC input voltage to the DC voltage without a bridge rectifier diode.

Each of the plurality of first switching elements and the second switching element may be controlled by a corresponding gate signal subjected to pulse width modulation (PWM) or pulse frequency modulation (PFM).

Various embodiments of the disclosure may comprise an electronic product with at least one inductor directly connected to an AC input stage, a plurality of first switching elements configured to control current to store magnetic energy in the inductor(s), an output capacitor configured to smooth the DC voltage, and a second switching element configured to maintain a substantially constant voltage between a ground voltage of the AC input stage and a ground voltage of an output stage.

The second switching element may be connected in series between the first switching element(s) and the output capacitor.

A voltage between the ground voltage of the AC input stage and the ground voltage of the output stage may be due to parasitic capacitance.

The voltage between the ground voltage of the AC input stage and the ground voltage of the output stage may be maintained at a substantially constant value corresponding to a difference between the AC input voltage and the DC output voltage.

The DC output voltage may be a voltage across the output capacitor.

The second switching element and the plurality of first switching elements may be controllable to be turned on and turned off.

At least one diode corresponding to the at least one inductor may be connected in series between the at least one inductor and the output capacitor, and may be configured to supply energy in the magnetic energy stored in the at least one inductor to the output capacitor when any one of the plurality of first switching elements is turned off.

The output capacitor may have a positive electrode connected to a cathode of each of the at least one diode, and a negative electrode connected to a source of the second switching element, and the AC input voltage is converted to the DC voltage without a bridge rectifier.

Each of the plurality of first switching elements and the second switching element may be controlled by a corresponding gate signal subjected to pulse width modulation (PWM) or pulse frequency modulation (PFM).

Accordingly, an electronic product may comprise the power factor correction circuit that converts an AC input voltage to a DC output voltage as described above, where the power factor correction circuit comprises at least one inductor directly connected to an AC input stage, a plurality of first switching elements configured to control current to store magnetic energy in the at least one inductor; an output capacitor configured to smooth the DC voltage, and a second switching element configured to maintain a substantially constant voltage between a ground voltage of the AC input stage and a ground voltage of an output stage.

Common mode electromagnetic interference (EMI) noise of the power factor correction circuit is reduced. Further, since the power factor is corrected using the bridgeless circuit with no rectifier diode, it is possible to reduce the cost and size of the circuit and to improve electrical efficiency of the power factor correction circuit by eliminating conduction loss due to the diode.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 2 is a circuit diagram illustrating an operation mode when a right switching element of the generally used bridgeless power factor correction circuit is turned on;

DETAILED DESCRIPTION

Figure 1:
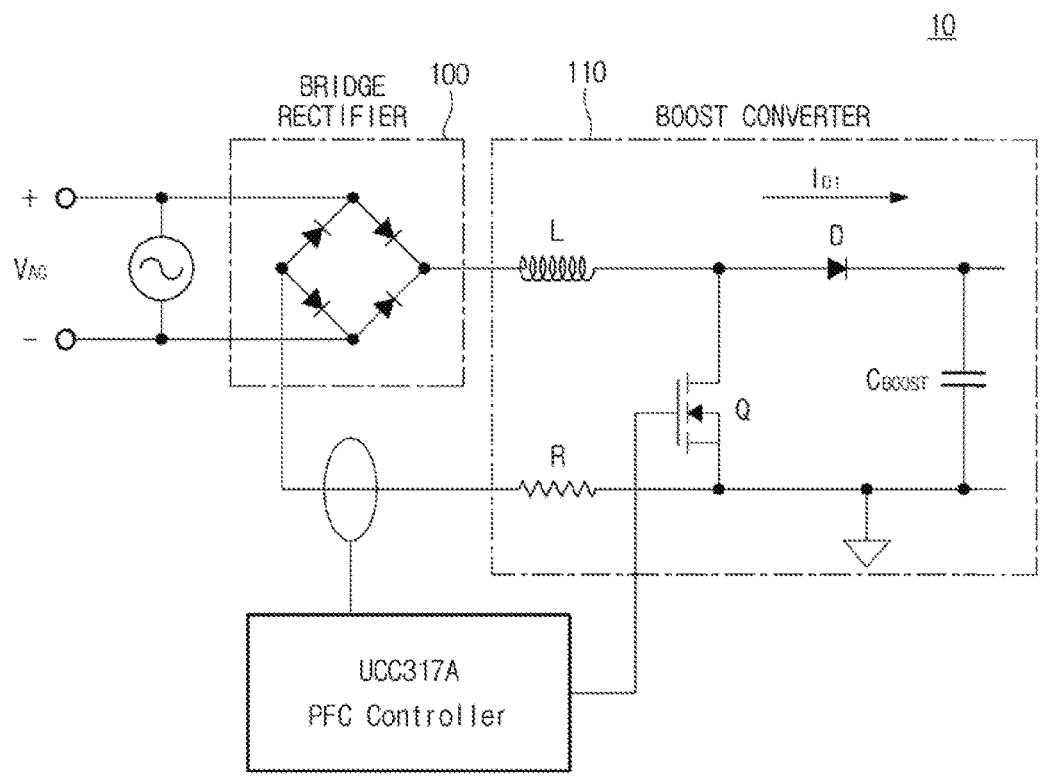
FIG. 1 is a circuit diagram illustrating a generally used boost type power factor correction circuit including a bridge diode.

Advantages and characteristics of the present disclosure and methods of achieving the same will be apparent from embodiments to be described in detail with the accompanying drawings.

Embodiments described herein and configurations illustrated in the drawings are merely preferred examples of the disclosed disclosure, and it is understood that there are various modification examples of the embodiments and the drawings of this specification.

Hereinafter, a power factor correction circuit and an electronic product including the same will be described in detail according to embodiments to be described below with reference to the accompanying drawings. In the drawings, the same components are denoted with the same reference numerals, and repeated descriptions thereof will be omitted. Furthermore, detailed description of a related, well-known technology will be omitted. In this specification, terms such as first and second are used to distinguish one component from other components, and a component is not limited by the above terms.

A "switching element" refers to an element connecting or disconnecting a portion of a circuit, or allowing or blocking current in an electric and electronic device. This switching element may be a transistor such as a bipolar junction transistor (BJT) or a field-effect transistor (FET) that provide a connection for a current flow according to a control signal, but is not necessarily limited thereto.

When the switching element operates as, for example, a field effect transistor (FET), the terminals of the switching element are usually a gate, a drain, and a source. It is well known that a drain can function as a source and the source can function as a drain according to the voltage of an input signal.

A switching element may be classified as a low-voltage switching element (LN) that operates at a low voltage or a high-voltage switching element (HN) that operates at a high voltage. In particular, the high-voltage switching element (HN) is a switching element that can withstand high voltages to its drain, and is generally used in various power devices.

The high-voltage switching elements may be double-diffused MOSFET (DMOSFET), insulated gate bipolar transistor (IGBT), extended drain MOSFET (EDMOSFET), and lateral double-diffused MOSFET (LDMOSFET), but is not limited thereto.

The term "turn on" refers to changing the switching element from a non-conduction state to a conduction state. On the other hand, "turn off" refers to changing the switching element from a conduction state to a non-conduction state. The switching element may be turned on by applying a first appropriate signal to the gate so that current flows through the switching element, and turned off by applying a second appropriate signal to the gate to effectively create an open circuit.

When AC current flows into an inductor via its first terminal and then out of the inductor via its second terminal, the inductor may be said to store energy that can be released as current that flows opposite to the present current flow. For the sake of simplicity, storing energy by an inductor can be referred to as "charging" the inductor, and releasing energy by an inductor can be referred to as "discharging" the inductor.

The present disclosure relates to a power factor correction circuit that is generally used in most electrical devices and electronic products such as a single-phase home appliance system, including an air conditioner and a display driving system. The single-phase home appliance system may include a power factor correction circuit, an AC-DC converter, and a motor. In these systems, the power factor correction circuit may correct a power factor of an AC input voltage and an AC input current and may generate a constant DC voltage. Power factor regulation (or correction) is desirable in most electrical and electronic products.

FIG. 1 is a circuit diagram illustrating a generally used boost type power factor correction circuit including a bridge diode.

As illustrated in FIG. 1, the boost-type power factor correction circuit including a bridge diode may include a bridge rectifier 100 and a boost converter 110. The boost converter 110 may include an inductor L, an output capacitor $C_{BOOST}$, a diode D, a resistor R, a switching element Q, and a control unit (not illustrated) that controls a switching operation of the switching element Q.

The bridge rectifier 100 may be supplied an input AC voltage $V_{AC}$, and the first terminal of the inductor L may be connected with the first output terminal of the bridge rectifier 100. The diode D has an anode that may be connected in series with the second terminal of the inductor L and the drain of the switching element Q, and the cathode may be connected to a first terminal of the output capacitor $C_{BOOST}$. The second terminal of the output capacitor $C_{BOOST}$ may be connected to the ground terminal. The source of the switching element Q may be connected to the ground terminal, and the gate may be connected to a control unit (not shown), such that the switching element Q may operate under the control of the control unit. The source of the switching element Q may be connected to the first terminal of the resistor R, and the second terminal of the resistor R may be connected to the second output terminal of the bridge rectifier 100.

The control unit may generate a gate signal for the switching element Q using pulse width modulation (PWM) or pulse frequency modulation (PFM). Both PWM and PFM convert an analog signal to a digital signal. Since digital signals are generally more robust against noise than analog signals, it may be advantageous to use PWM or PFM rather than an analog signal to control the switching element Q. In pulse width modulation the width of a pulse increases when the amplitude of the analog signal is large and decreases when the amplitude is small. Pulse frequency modulation is a scheme of changing a repetition frequency of the pulse according to the magnitude of the signal, where the repetition frequency increases when the signal is large and decreases when the signal is small.

The boost type power factor correction circuit 10 including the bridge rectifier 100 and the boost converter 110 illustrated in FIG. 1 performs a switching operation for power factor correction and output. In this case, a current flowing in the circuit passes through two diodes of the bridge rectifier 100. Since the diodes of the bridge rectifier have a resistive component, power loss $P=I^2*R$ is generated. Accordingly, the boost-type power factor correction circuit including the bridge rectifier 100 has a conduction loss caused by two diodes of the bridge rectifier 100. Therefore, there is a disadvantage that electrical efficiency of the circuit is low.

Figure 2:
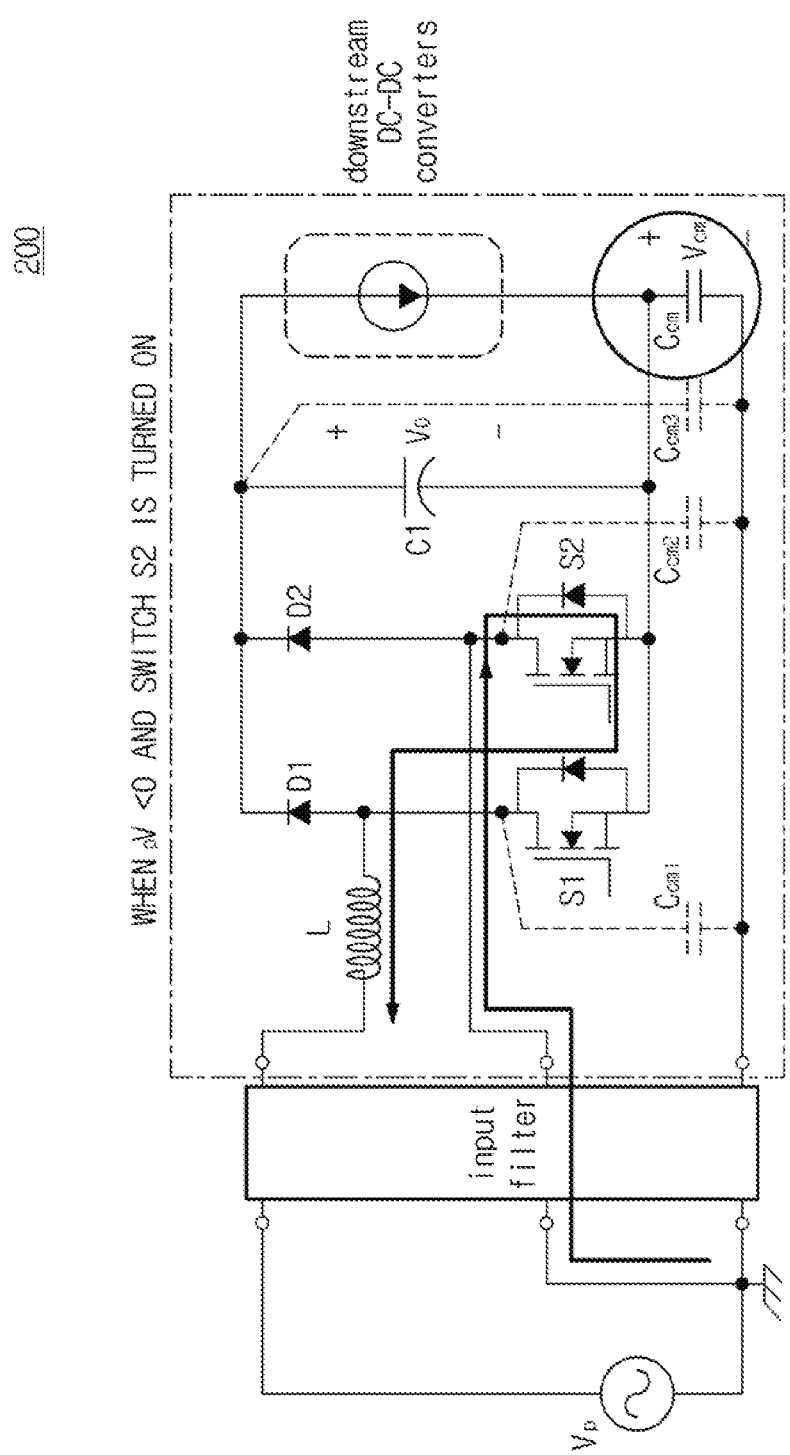

FIG. 2 is a circuit diagram illustrating an operation mode when the right switching element of a generally used bridgeless power factor correction circuit is turned on.

A power factor correction circuit 200 without a bridge rectifier, as illustrated in FIG. 2, is used in order to reduce the conduction loss in the boost-type power factor correction circuit including a bridge rectifier. While the conduction loss is reduced and efficiency is increased in a typical bridgeless power factor correction circuit, there is a drawback in that common mode EMI noise is large. Common mode EMI noise refers to noise generated in common in both power line and ground line of a transmission path in a symmetric power system. Specifically, common mode EMI noise is noise appearing in phase with respect to ground from each line of power transfer lines, and is also referred to as in-phase noise. The noise is caused by electrostatic induction due to equivalent capacitance of the line and surroundings thereof, and electromagnetic induction due to a magnetic field linking with the line.

Referring to FIG. 2, the common mode EMI noise is generated due to switching noise caused by a voltage $V_{cm}$ between the ground on the AC input power supply side and the ground on the output side and the parasitic capacitor $C_{cm}$ present in a circuit board. The term "parasitic capacitor" is a way to describe unintended capacitive effect caused by various circuitry elements of the circuit. In a typical capacitor two metal plates face each other with dielectric material in between, such that an induced current flows when an AC voltage is applied. This capacitive effect may appear, for example, with conductors on a printed circuit board when an AC voltage is applied between the adjacent conductors in the circuit. This capacitive effect may be described as being a result of a "parasitic capacitor."

In FIG. 2, $C_{cm}$ indicates the parasitic capacitor. As a result, the voltage $V_{cm}$ between the ground on the AC input power supply side and the ground on the DC output side may be considered to be a voltage across the parasitic capacitor $C_{cm}$. Since the ground voltage on the AC input power supply side is 0 V, $V_{cm}$ may be represented as the ground voltage of the output stage.

As illustrated in FIG. 2, the power factor correction circuit 200 may include an inductor L, an output capacitor C1, diodes D1 and D2, switching elements S1 and S2, and a control unit (not illustrated) that controls a switching operation of the switching elements S1 and S2.

The first terminal of the inductor L may be connected to the first power terminal for the input AC voltage $V_P$, and the second terminal of the inductor L may be connected to the to the anode of D1 and the drain of the switching element S1. The second power terminal for the input AC voltage $V_P$ may be connected to the anode of D2 and the drain of the switching element S2. The cathodes of the switching elements S1 and S2 may be connected to the first terminal of the output capacitor C1.

The sources of the switching elements S1 and S2, and the second terminal of the output capacitor C1 may be connected to the DC ground. The gates of the switching elements S1 and S2 may be connected to the control unit. The switching elements S1 and S2 may operate under the control of the control unit.

Causes of the common mode EMI noise in the generally used power factor correction circuit 200 will be described with reference to FIGS. 2 to 4.

Figure 3:
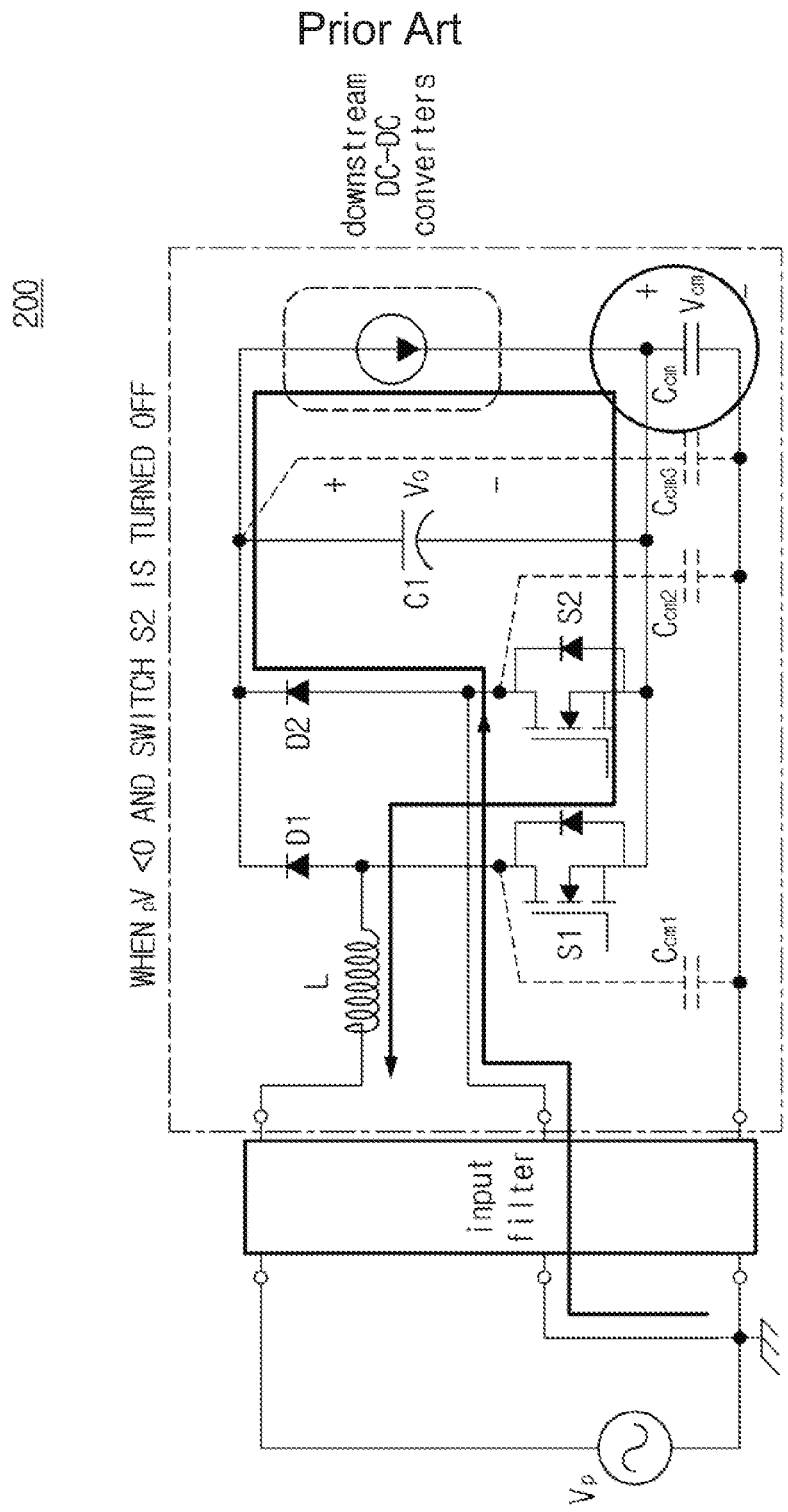
FIG. 3 is a circuit diagram illustrating an operation mode when the right switching element of the generally used bridgeless power factor correction circuit is turned off.

FIG. 3 is a circuit diagram illustrating an operation mode when the right switching element of the generally used bridgeless power factor correction circuit is turned off.

In FIGS. 2 and 3, an example in which an input AC voltage $V_P$ has a negative (−) value is illustrated. An operation of the power factor correction circuit 200 when the input AC voltage $V_P$ has a negative value will be briefly described. The switching element S1 is turned on when the AC voltage $V_P$ is negative. Accordingly, when the switching element S2 is turned on during a half cycle corresponding to negative values of an input AC voltage $V_P$, the two switching elements S1 and S2 are in a conduction state. As shown in FIG. 2, current may then flow through the switching element S2, through the switching element S2, then through the inductor L. Accordingly, since there may be very little voltage drop across the switching elements S1 and S2, most of the input AC voltage $V_P$ may be applied across the inductor L. The inductor L may be charged, and the inductor L may later discharge to the capacitor C1.

As shown in FIG. 3, when the gate signal of the switching element S2 is turned off, the current flow may be through the diode D2, and then through a load (downstream DC-DC converters) as well as charging the capacitor C1. The current may then flow through the switching element S1 and through the inductor L. Accordingly, the inductor L will be charged.

When the gate of the switching element S2 is turned off, the energy stored in the inductor L is supplied to the output capacitor C1 via the diode D2, and the current in the inductor L is reduced.

The power factor correction circuit 200 repeats this operation during the half cycle corresponding to the negative values. During the half cycle corresponding to positive (+) values, a voltage opposing the voltage in the half cycle of the negative values is applied to the inductor L. Accordingly, in this case, the inductor current flows into the power factor correction circuit 200, and the stored energy in the inductor L is supplied to the output capacitor C1 via the diode D1. The power factor correction circuit 200 repeats the above-described operations during the half cycles corresponding to the positive (+) values and the negative (−) values. As a result, the output capacitor C1 is charged with the inductor current proportional to the input voltage, a DC voltage is obtained, and accordingly, the improvement of the power factor is achieved.

A cause of the common mode EMI noise will now be described. As illustrated in FIG. 2, when the input AC voltage $V_P$ has a negative value and the switching element S2 is turned on, the circuit forms a current flow as illustrated in FIG. 2. In this case, a ground voltage $V_{cm}$ of the output stage is equal to the ground voltage (0 V) on the input AC voltage $V_P$ side because there is no current flow across the parasitic capacitor $C_{cm}$. However, as illustrated in FIG. 3, when the input AC voltage $V_P$ is negative and the switching element S2 is turned off, the circuit has current flow as illustrated in FIG. 3. In this case, the ground voltage $V_{cm}$ of the output stage has a $-V_0$ value which is a negative output voltage, where $V_0$ is the voltage across the capacitor C1. Accordingly, when the input AC voltage $V_P$ is negative, the ground voltage $V_{cm}$ of the output stage alternates between the ground voltage (0 V) on the input AC voltage $V_P$ side and the $-V_0$ voltage that is a negative output voltage in a switching cycle according to turn-on and turn-off states of the switching element S2. Therefore, this switching between the two voltages generates electromagnetic interference.

Figure 4:
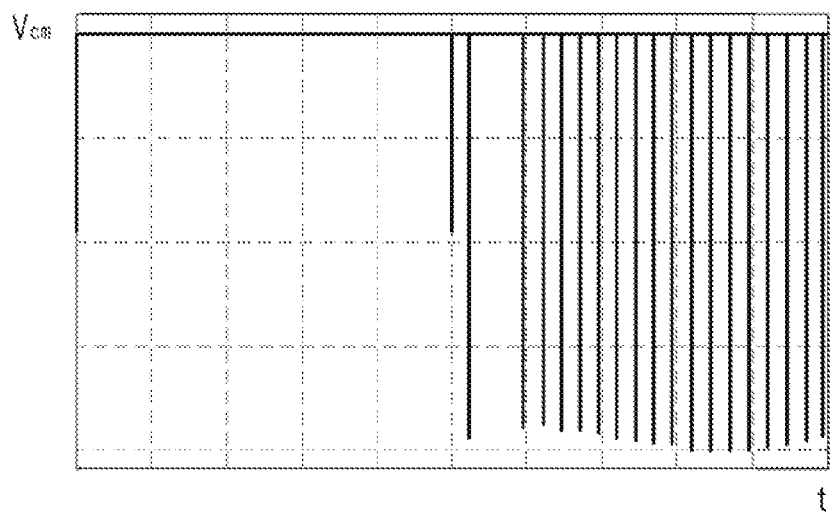
FIG. 4 is a graph illustrating switching noise generated in the generally used bridgeless power factor correction circuit.

FIG. 4 is a graph illustrating a switching noise generated in a generally used bridgeless power factor correction circuit.

As illustrated in FIG. 4, the Y-axis of the graph indicates ground voltage $V_{cm}$ in volts of an output stage at which the switching noise is generated, and the X-axis indicates time t. The parasitic capacitor $C_{cm}$ is generated over time, and $V_{cm}$ alternately goes from 0 volts to $-V_0$ volts, and back, as the switching element S2 is turned on and off, as described above with reference to FIGS. 2 and 3. Therefore, switching noise is generated due to the changing voltage $V_{cm}$, and the switching noise results in electromagnetic interference.

Figure 5:
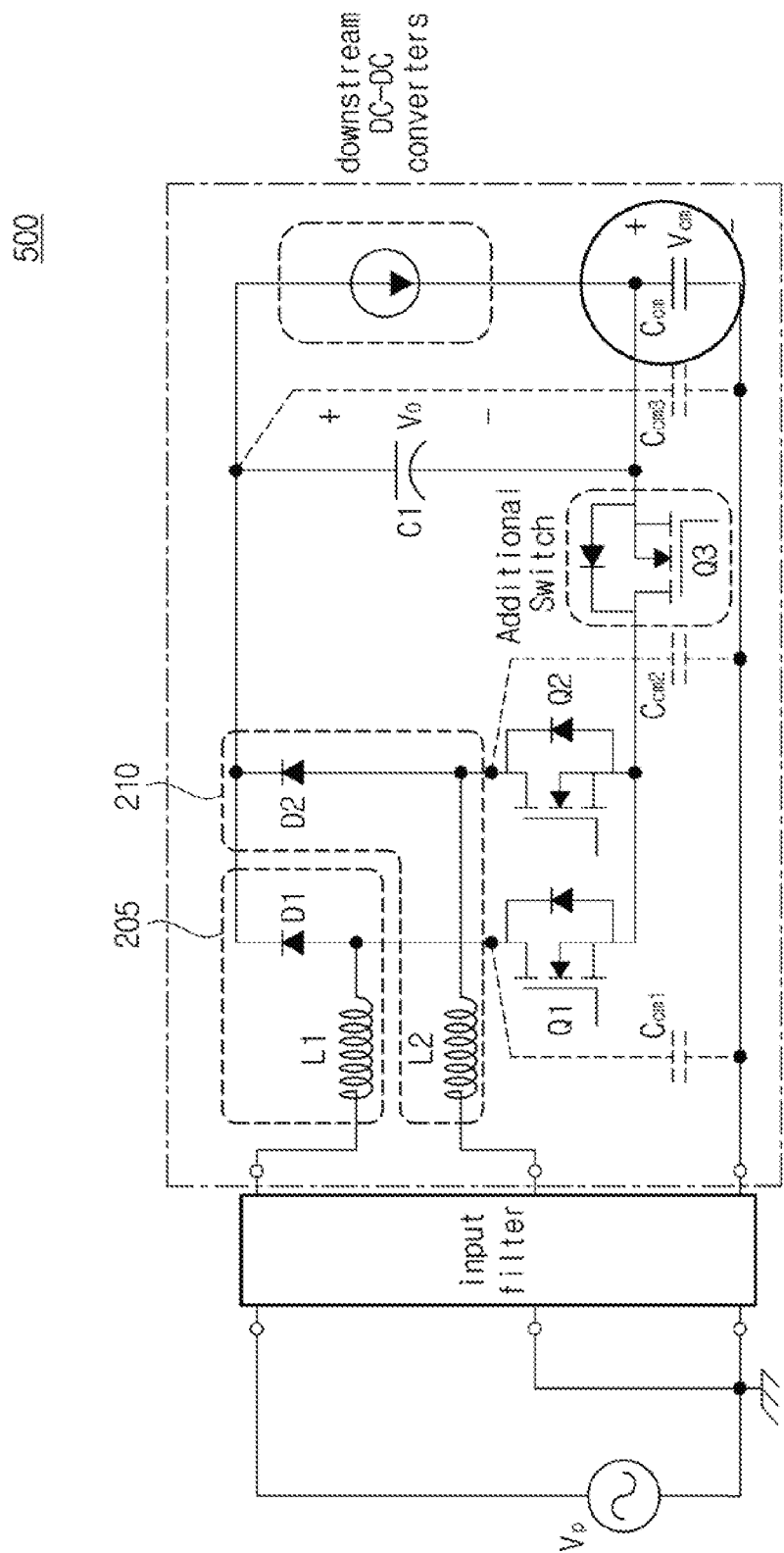
FIG. 5 is a circuit diagram illustrating a proposed bridgeless power factor correction circuit according to an embodiment of the present disclosure.

FIG. 5 is a circuit diagram illustrating a proposed bridgeless power factor correction circuit according to an embodiment of the present disclosure.

As illustrated in FIG. 5, the proposed bridgeless power factor correction circuit 500 may be similar to that of FIGS. 2 & 3 except that there are two inductors L1 and L2 rather than the single inductor L of FIG. 3, and there is an additional switching element Q3. The switching elements S1 and S2 of FIG. 3 have been renamed to Q1 and Q2 in FIG. 5.

As can be seen in FIG. 5, the bridgeless power factor correction circuit 500 may receive AC power via the inductors L1 and L2 connected directly to the AC input stage. The diodes D1 and D2 may be connected in series between the inductors L1 and L2, respectively, and the output capacitor C1. The energy stored in the inductors L1 and L2 may be supplied to the output capacitor C1 when either of the switching elements Q1 and Q2 is turned off. The switching element Q3 may maintain a ground voltage of the AC input stage and a ground voltage $V_{cm}$ of an output stage to be constant, and a control unit (not illustrated) may control switching operations of the switching elements.

The inductors L1 and L2 may be used to receive the input AC voltage $V_P$. Anodes of the diodes D1 and D2 may be connected in series with the inductors L1 and L2, respectively, and the drains of the switching elements Q1 and Q2, respectively, and cathodes of the diodes D1 and D2 may be connected to first terminal of the output capacitor C1.

The sources of the switching elements Q1 and Q2 may be connected to a drain of the switching element Q3, and the gates of the switching elements Q1 and Q2 may be connected to the control unit. The switching elements Q1 and Q2 may be operated under the control of the control unit.

The source of the switching element Q3 may be connected to the ground terminal, and a gate of the switching element Q3 may be connected to the control unit. The switching element Q3 may be operated under the control of the control unit. The control unit may drive the switching elements Q1, Q2 and Q3 using gate signals subjected to pulse width modulation (PWM) or pulse frequency modulation (PFM). Repeated description related to switching operation control will be omitted.

One terminal of the output capacitor C1 may be connected to the diodes D1 and D2, and the other terminal thereof may be grounded.

A schematic operation of the bridgeless power factor correction circuit 500 illustrated in FIG. 5 will be described. The bridgeless power factor correction circuit 500 according to an embodiment may include a first booster 205 and a second booster 210. In this case, the first booster 205 may serve to boost an input voltage while a positive (+) input voltage is applied, and the second booster 210 may serve to boost the input voltage while a negative (−) input voltage is applied.

The first booster 205 includes the inductor L1 and the diode D1, and the second booster 210 includes the inductor L2, and the diode D2. The first booster 205 may boost the input AC voltage $V_P$ while a positive input AC voltage $V_P$ is applied, and the switching element Q1 may control charging and discharging of the first booster 205. The second booster 210 may boost the input AC voltage $V_P$ while a negative input AC voltage $V_P$ is applied, and the switching element Q2 may control charging and discharging of the second booster 210.

When current flows into the bridgeless power factor correction circuit 500 via the inductor L1, then current flows out of the bridgeless power factor correction circuit 500 via the inductor L2, and vice versa. Accordingly, when L1 is charged in one direction due to flow of current, then L2 is charged in the other direction by the flow of the same current. The effect may be to increase current flow when the inductors L1 and L2 discharge.

By controlling the signal applied to the switching elements Q1 and Q2, charging and discharging time of the inductors L1 and L2 can be adjusted, and accordingly, magnitude of a voltage supplied to the load can be adjusted. The signal applied to the switching elements Q1 and Q2 can be adjusted under the control of the control unit.

The inductor L1 and the inductor L2 may not necessarily be separate elements, but may be configured to be together, for example, in one package. Further, the output capacitor C1 is intended to smooth the voltage provided to the load. Smoothing refers to removing AC ripple components to enable a stable supply of power at an acceptably flat DC voltage.

As illustrated in FIG. 5, the bridgeless power factor correction circuit 500 according to an embodiment may include the switching element Q3, and maintains the ground voltage $V_{cm}$ of the output stage to be constant by use of the switching element Q3. An embodiment according to an operation mode of the circuit will be described with reference to FIGS. 6 to 11.

The circuit of FIG. 5 may operate in various operation modes. In operation mode 1, the input AC voltage $V_P$ is positive, and the switching element Q1 is off, while the switching elements Q2 and Q3 are on. In operation mode 2, the input AC voltage $V_P$ is positive, and the switching elements Q1 and Q2 are on, while the switching element Q3 is off. In operation mode 3, the input AC voltage $V_P$ is negative, and the switching elements Q1 and Q3 are on, while the switching element Q2 is off. In operation mode 4, the input AC voltage $V_P$ is negative, and the switching elements Q1 and Q2 are on, while the switching element Q3 is off.

Figure 6:
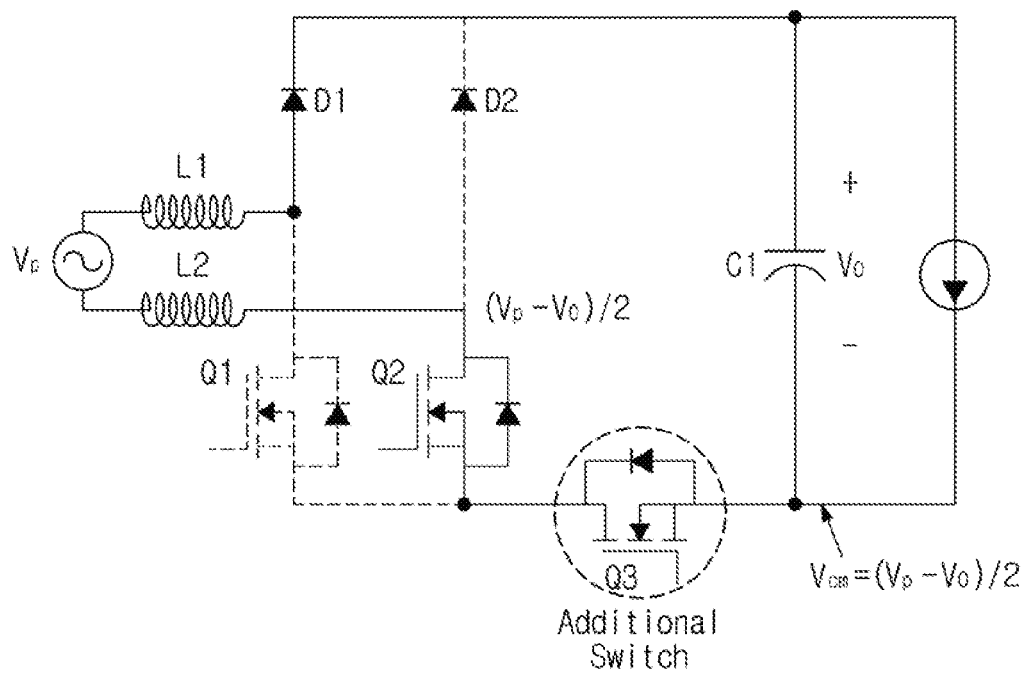
FIG. 6 is a circuit diagram in operation mode 1 of the proposed bridgeless power factor correction circuit according to an embodiment of the present disclosure.

FIG. 6 is a circuit diagram illustrating a case of operation mode 1 in the proposed bridgeless power factor correction circuit according to an embodiment of the present disclosure. FIG. 6 shows in faded lines those elements that are not involved in the current flow.

As illustrated in FIG. 6, in operation mode 1 a positive input AC voltage $V_P$ is applied, and the switching element Q1 is turned off while the switching elements Q2 is turned on and the switching element Q3 is turned on. Accordingly, current may flow through the inductor L1, the diode D1, the load, the switching elements Q3 and Q2, and the inductor L2. Therefore, the inductors L1 and L2 may be discharged such that the energy stored in the inductors L1 and L2 may be delivered to the load.

Figure 10:
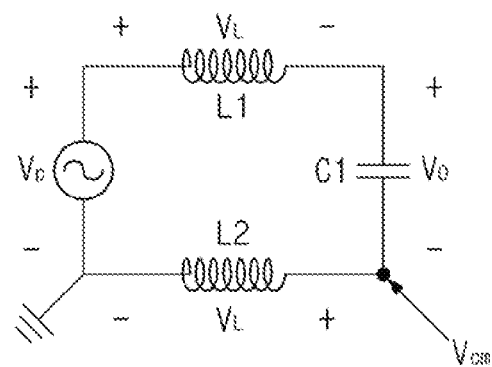
FIG. 10 is a schematic diagram concisely representing a circuit diagram in operation mode 1 and operation mode 3 of the proposed bridgeless power factor correction circuit according to an embodiment of the present disclosure.

FIG. 10 shows calculation of a voltage at the ground voltage $V_{cm}$ of the output stage for operation mode 1. FIG. 10 is a schematic diagram concisely representing a circuit diagram in operation mode 1 and operation mode 3 of the bridgeless power factor correction circuit 500 according to an embodiment of the present disclosure.

As illustrated in FIG. 10, in operation mode 1, when the positive input AC voltage $V_P$ is applied, the voltage of the output capacitor C2 is $V_O$ and a voltage across the inductor L1 and the inductor L2 is $V_L$, an equation such as Equation 1 is satisfied according to Kirchhoff's Voltage Law (KVL).

$$-V_P + V_L + V_O + V_L = 0 \qquad \text{[Equation 1]}$$

Accordingly, from Equation 1, $V_L = (V_P - V_O)/2$, and since $V_L = V_{cm}$ due to input-side ground, $V_{cm} = (V_P - V_O)/2$.

Figure 7:
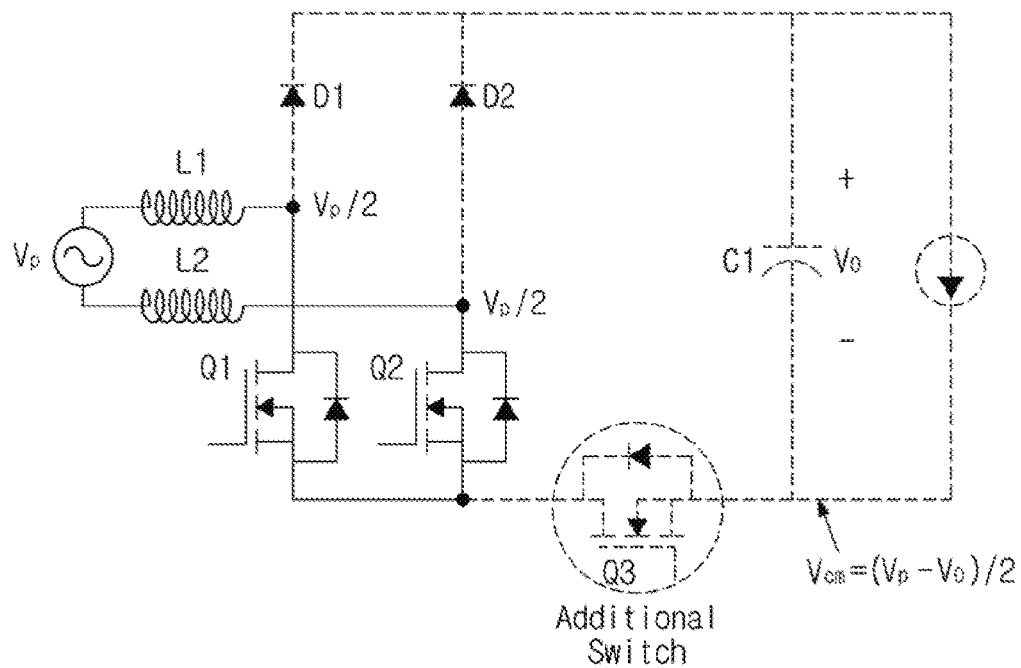
FIG. 7 is a circuit diagram in operation mode 2 of the proposed bridgeless power factor correction circuit according to an embodiment of the present disclosure.

FIG. 7 is a circuit diagram in operation mode 2 of the proposed bridgeless power factor correction circuit according to an embodiment of the present disclosure. FIG. 7 shows in faded lines those elements that are not involved in the current flow.

As illustrated in FIG. 7, in operation mode 2, a positive input AC voltage $V_P$ is applied, and the switching element Q1 is turned on and the switching element Q2 turned on while the switching element Q3 is turned off. Accordingly, current may flow through the inductor L1, the switching element Q1, the switching element Q2, and the inductor L2. Accordingly, in operation mode 2 the inductor L1 and the inductor L2 are charged to later deliver the stored energy to a load.

Figure 11:
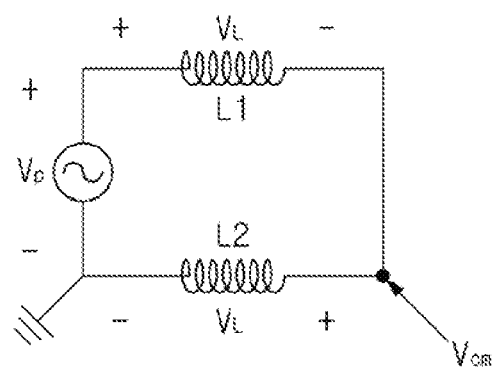
FIG. 11 is a schematic diagram concisely representing a circuit diagram in operation mode 2 and operation mode 4 of the proposed bridgeless power factor correction circuit according to an embodiment of the present disclosure.

FIG. 11 shows calculation of a voltage at the ground voltage $V_{cm}$ of the output stage for operation mode 2. FIG. 11 is a schematic diagram concisely representing a circuit diagram in operation mode 2 and operation mode 4 of the proposed bridgeless power factor correction circuit according to an embodiment of the present disclosure.

As illustrated in FIG. 11, in operation mode 2, a positive input AC voltage $V_P$ is applied, and the output capacitor C2 does not appear. When a voltage across the inductor L1 and the inductor L2 is $V_L$, an equation such as Equation 2 is satisfied according to Kirchhoff's voltage law.

$$-V_P + V_L + V_L = 0 \qquad \text{[Equation 2]}$$

From Equation 2, $V_L = V_P/2$, and a ground voltage of the output stage may be $V_{cm} = (V_P - V_O)/2$. When the switching element Q3 is turned off, no current flows through a load. Accordingly, $V_{cm} = (V_P - V_O)/2$ may be maintained, as in operation mode 1. When there is no switching element Q3, as in FIG. 2, the $V_{cm}$ value has a $V_P/2$ value like the $V_L$ value and has a different value from the value in operating mode 1 within the switching period of the switching element Q1. Thus, when there is no switching element Q3 as in FIG. 2, switching noise having the voltage $V_{cm}$ is generated, and accordingly, the common mode EMI noise is generated. However, since the voltage $V_{cm}$ can be maintained to be constant due to the presence of the switching element Q3 in an embodiment of the present disclosure, it is possible to reduce the switching noise being generated.

Figure 8:
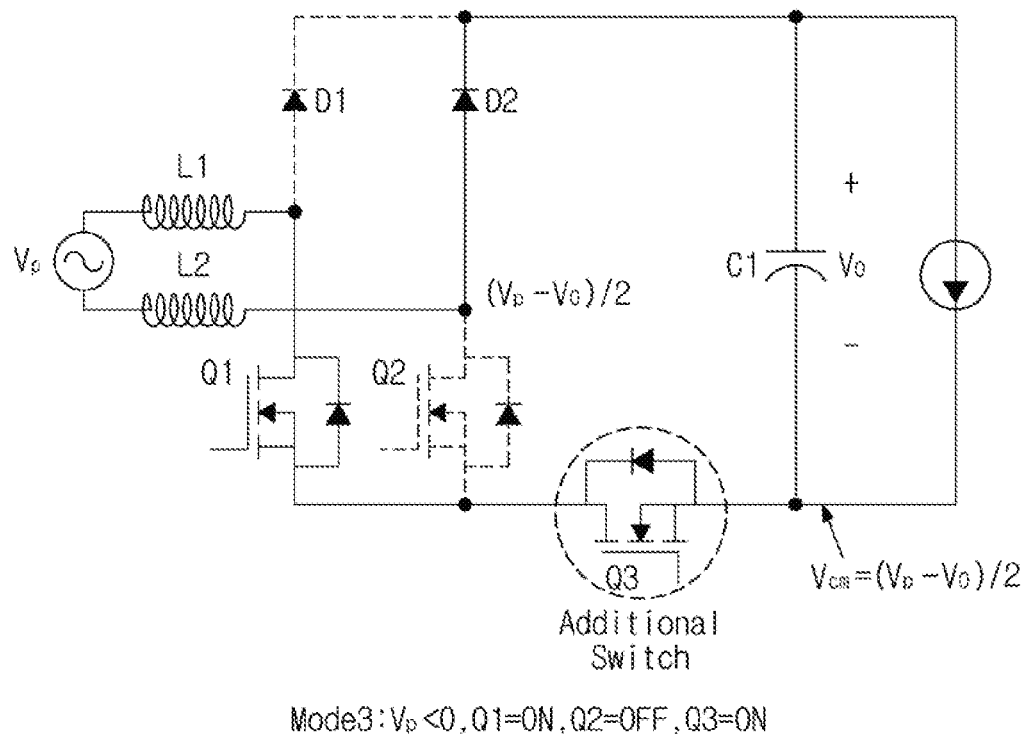
FIG. 8 is a circuit diagram in operation mode 3 of the proposed bridgeless power factor correction circuit according to an embodiment of the present disclosure.

FIG. 8 is a circuit diagram in operation mode 3 of the proposed bridgeless power factor correction circuit according to an embodiment of the present disclosure. FIG. 8 shows in faded lines those elements that are not involved in the current flow.

As illustrated in FIG. 8, in operation mode 3 a negative input AC voltage $V_P$ is applied, and the switching element Q1 is turned on and the switching element Q2 is turned off, while the switching element Q3 is turned on. A current may flow via the inductor L2, the diode D2, the load, the switching element Q3, the switching element Q1, and the inductor L1. Accordingly, the inductor L1 and the inductor L2 may be discharged to provide the stored energy of the inductors L1 and L2 to the load.

In this case, when a voltage across the inductor L1 and the inductor L2 is $V_L$, where $V_L=(V_P-V_O)/2$, the ground voltage of the output stage may be $V_{cm}=(V_P-V_O)/2$. Since the calculation of $V_L$ and $V_{cm}$ has been described previously, it will not be described again.

Figure 9:
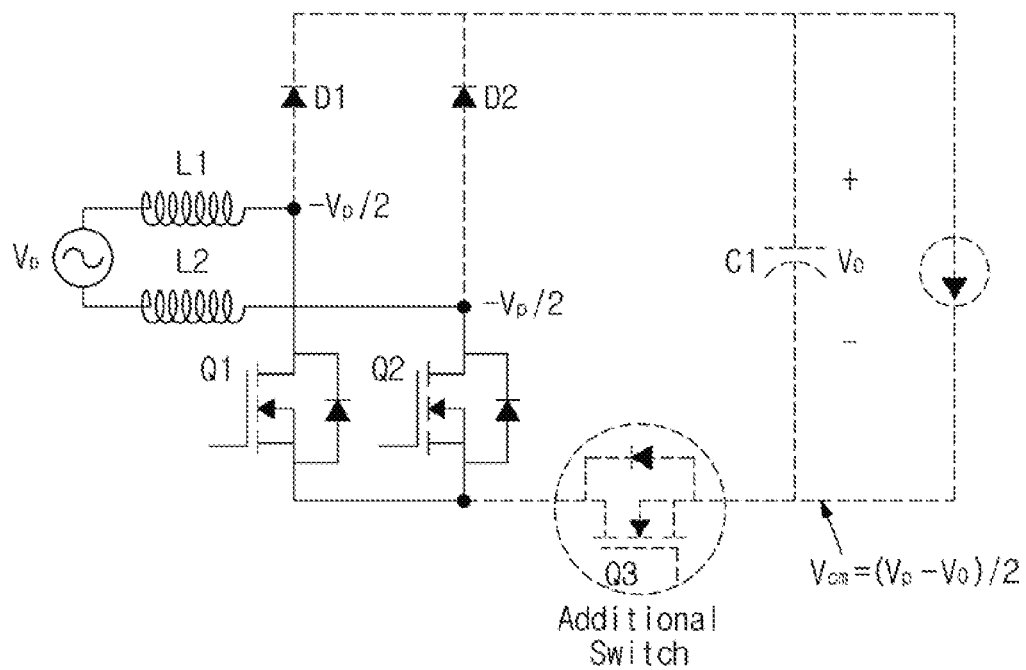
FIG. 9 is a circuit diagram in operation mode 4 of the proposed bridgeless power factor correction circuit according to an embodiment of the present disclosure.

FIG. 9 is a circuit diagram in operation mode 4 of the proposed bridgeless power factor correction circuit according to an embodiment of the present disclosure. FIG. 9 shows in faded lines those elements that are not involved in the current flow.

As illustrated in FIG. 9, in operation mode 4, the input AC voltage $V_P$ is negative, and the switching element Q1 is turned on and the switching element Q2 is turned on, while the switching element Q3 is turned off. Accordingly, current may flow through the inductor L2, the switching element Q2, the switching element Q1, and the inductor L1. In this case, similarly to operation mode 2 shown in FIG. 7, the inductors L1 and L2 are charged.

In operation mode 4, the voltage across the inductor L1 and the inductor L2 may be $V_L=-V_P/2$, and the ground voltage of the output stage may be $V_{cm}=(V_P-V_O)/2$. When the switching element Q3 is turned off, no current flows. Accordingly, $V_{cm}=(V_P-V_O)/2$ may be maintained, as in operation mode 3. Since the calculation of $V_L$ and $V_{cm}$ has been described previously, it will not be repeated. When there is no switching element Q3, as in FIG. 2, the $V_{cm}$ value has a value of $-V_P/2$, equal to the $V_L$ value, and has a different value from the value in operating mode 3 within the switching period of the switching element Q2. Thus, when there is no switching element Q3 as in FIG. 2, switching noise having the voltage $V_{cm}$ is generated, and accordingly, the common mode EMI noise is generated. However, since the voltage $V_{cm}$ can be maintained to be constant due to the presence of the switching element Q3 in an embodiment of the present disclosure, it is possible to reduce the switching noise being generated.

The bridgeless power factor correction circuit according to the disclosed disclosure may be generally used in most electronic products such as a single-phase home appliance system, including an air conditioner and a display driving system. Accordingly, in the electronic products including the bridgeless power factor correction circuit according to the above-described embodiment, the power factor can be corrected with high efficiency, and the common mode EMI noise can be reduced.

The power factor correction circuit and the electronic product including the same according to the preferred embodiments have been described above with reference to the illustrated drawings. Examples of the power factor correction circuit and the electronic product including the same are not limited thereto, and the above-described embodiments are illustrative in all aspects. Therefore, it would be appreciated by those skilled in the art that the present disclosure may be embodied in other specific forms without departing from the technical spirit or essential characteristics of the disclosure. The scope of the present disclosure is defined by claims rather than the foregoing description, and all differences within the equivalent range should be construed as being included in the present disclosure.

DESCRIPTION OF THE LABELS

100: BRIDGE RECTIFIER
110: BOOST CONVERTER
205: FIRST BOOSTER
210: SECOND BOOSTER
L1, L2: INDUCTOR
D1, D2: DIODE
C1: OUTPUT CAPACITOR
Q1, Q2: FIRST SWITCHING ELEMENT
Q3: SECOND SWITCHING ELEMENT

What is claimed is:

1. A power factor correction circuit that converts an AC input voltage to a DC output voltage, the power factor correction circuit comprising:
    a first inductor directly connected to a first end of an AC input stage and a second inductor directly connected to a second end of the AC input stage;
    a plurality of first switching elements configured to control current to store magnetic energy in at least one of the first inductor and the second inductor;
    an output capacitor configured to smooth the DC output voltage; and
    a second switching element configured to maintain a substantially constant voltage between a ground voltage of the AC input stage and a ground voltage of an output stage,
    wherein:
        the second switching element is turned on when any one of the plurality of first switching elements is turned off, and
        the second switching element is turned off when all of the plurality of first switching elements are turned on.

2. The power factor correction circuit according to claim 1, wherein the second switching element is connected in series between the plurality of first switching elements and the output capacitor.

3. The power factor correction circuit according to claim 1, wherein the substantially constant voltage is due to parasitic capacitance present in the power factor correction circuit.

4. The power factor correction circuit according to claim 1, wherein the substantially constant voltage is maintained to be substantially constant at a value corresponding to a difference between the AC input voltage and the DC output voltage.

5. The power factor correction circuit according to claim 1, wherein the DC output voltage is a voltage across the output capacitor.

6. The power factor correction circuit according to claim 1, further comprising:
    a first diode corresponding to the first inductor, directly connected in series to the first inductor at a first end of the first diode and directly connected in series to the output capacitor at a second end of the first diode; and
    a second diode, corresponding to the second inductor, directly connected in series to the second inductor at a first end of the second diode and directly connected in series to the output capacitor at a second end of the second diode,
    wherein at least one of the first inductor and the second inductor is configured to supply energy in the magnetic energy stored in a respective one of the first inductor and the second inductor to the output capacitor when any one of the plurality of first switching elements is turned off.

7. The power factor correction circuit according to claim 6, wherein the output capacitor has a positive electrode connected to a cathode of each of the first diode and the second diode, and a negative electrode connected to a source of the second switching element.

8. The power factor correction circuit according to claim 1, wherein the power factor correction circuit converts the AC input voltage to the DC output voltage without a bridge rectifier.

9. The power factor correction circuit according to claim 1, wherein each of the plurality of first switching elements and the second switching element is controlled by a corresponding gate signal subjected to pulse width modulation (PWM) or pulse frequency modulation (PFM).

10. An electronic product comprising:
a first inductor directly connected to a first end of an AC input stage;
a second inductor directly connected to a second end of the AC input stage;
a plurality of first switching elements configured to control current to store magnetic energy in at least one of the first inductor and the second inductor;
an output capacitor configured to smooth a DC output voltage; and
a second switching element configured to maintain a substantially constant voltage between a ground voltage of the AC input stage and a ground voltage of an output stage,
wherein:
the second switching element is turned on when any one of the plurality of first switching elements is turned off, and
the second switching element is turned off when all of the plurality of first switching elements are turned on.

11. The electronic product according to claim 10, wherein the second switching element is connected in series between the plurality of first switching elements and the output capacitor.

12. The electronic product according to claim 10, wherein the substantially constant voltage is due to parasitic capacitance.

13. The electronic product according to claim 10, wherein the substantially constant voltage is maintained to be substantially constant at a value corresponding to a difference between an AC input voltage and the DC output voltage.

14. The electronic product according to claim 10, wherein the DC output voltage is a voltage across the output capacitor.

15. The electronic product according to claim 10, further comprising:
a first diode corresponding to the first inductor, directly connected in series to the first inductor at a first end of the first diode and directly connected in series to the output capacitor at a second end of the first diode; and
a second diode corresponding to the second inductor, directly connected in series to the second inductor at a first end the second diode and directly connected in series to the output capacitor at a second end of the second diode,
wherein at least one of the first inductor and the second inductor is configured to supply energy in the magnetic energy stored in a respective one of the first inductor and the second inductor to the output capacitor when any one of the plurality of first switching elements is turned off.

16. The electronic product according to claim 15, wherein the output capacitor has a positive electrode connected to a cathode of each of the first diode and the second diode, and a negative electrode connected to a source of the second switching element.

17. The electronic product according to claim 10, wherein an AC input voltage is converted to the DC output voltage without a bridge rectifier.

18. The electronic product according to claim 10, wherein each of the plurality of first switching elements and the second switching element is controlled by a corresponding gate signal subjected to pulse width modulation or pulse frequency modulation.

* * * * *